United States Patent
Ueda

(10) Patent No.: US 7,269,440 B2
(45) Date of Patent: Sep. 11, 2007

(54) CELLULAR PHONE AND METHOD OF OPERATING THE SAME

(75) Inventor: Hideki Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 239 days.

(21) Appl. No.: 10/436,154

(22) Filed: May 13, 2003

(65) Prior Publication Data

US 2003/0216150 A1   Nov. 20, 2003

(30) Foreign Application Priority Data

May 14, 2002  (JP) .............................. 2002-139141

(51) Int. Cl.
*H04M 1/00* (2006.01)
*H04B 1/04* (2006.01)
*H01Q 1/48* (2006.01)

(52) U.S. Cl. .................. 455/552.1; 455/129; 343/846; 343/848

(58) Field of Classification Search ............ 455/552.1, 455/550.1, 90.1, 90.2, 90.3, 129, 575.5, 575.6, 455/575.7, 553.1; 343/846, 848, 860, 702
See application file for complete search history.

(56) References Cited

U.S. PATENT DOCUMENTS

| | | | |
|---|---|---|---|
| 5,982,330 A | * | 11/1999 | Koyanagi et al. ........... 343/702 |
| 5,995,052 A | | 11/1999 | Sadler et al. |
| 6,397,077 B1 | * | 5/2002 | Jensen ..................... 455/553.1 |
| 6,405,025 B1 | * | 6/2002 | Keski-Mattinen ........... 455/266 |
| 2001/0023196 A1 | * | 9/2001 | Kouyama ................... 455/567 |
| 2002/0169010 A1 | * | 11/2002 | Shoji et al. ................. 455/575 |
| 2002/0190913 A1 | | 12/2002 | Kuck |

FOREIGN PATENT DOCUMENTS

| | | |
|---|---|---|
| EP | 0548975 A1 | 6/1993 |
| EP | 0622864 A1 | 11/1994 |
| GB | 2257569 A | 1/1993 |
| JP | 7-283631 A | 10/1995 |
| JP | 2001-339474 A | 12/2001 |
| JP | 2002-076719 A | 3/2002 |

* cited by examiner

*Primary Examiner*—George Eng
*Assistant Examiner*—Wesley Kim
(74) *Attorney, Agent, or Firm*—Sughrue Mion, PLLC

(57) ABSTRACT

A cellular phone covering a plurality of frequency bands, includes (a) an antenna, (b) a high-frequency circuit, (c) an antenna-matching circuit electrically connecting in series between the antenna and the high-frequency circuit, and (d) a first unit which varies a ground length in accordance with a frequency band in which the cellular phone makes communication with others, the ground length being defined as a length of a ground area for the antenna-matching circuit.

19 Claims, 11 Drawing Sheets

IRRADIATION PATTERN
IN Y-Z PLANE [dBd]

IRRADIATION PATTERN
IN X-Z PLANE [dBd]

CELLULAR PHONE AND METHOD OF
OPERATING THE SAME

BACKGROUND OF THE INVENTION

1. Field of the Invention

The invention relates to a cellular phone, and more particularly to optimization in antenna performance in a cellular phone covering a plurality of different frequency areas.

2. Description of the Related Art

It is known that an antenna irradiation pattern indicating antenna characteristic of a cellular phone varies in independence on a length of a ground area of an antenna matching circuit which electrically connects an antenna and a high-frequency circuit to each other. Herein, a ground area indicates a ground of a printed substrate or a die-cast body, for instance. If such a ground area does not have an optimal length, a lot of poles called a null point appear in an antenna irradiation pattern. Herein, a null point means a point at which an antenna gain falls down.

Some cellular phones such as PDC (personal digital cellular) or W-CDMA (Wideband-Code Division Multiple Access) are designed to be able to cover a plurality of frequency bands. If such cellular phones have to cover two frequency bands quite different from each other, for instance, 800 MHz band and 2 GHz band, it would be quite difficult or almost impossible to accomplish antenna characteristic by which null points are not generated, through a single ground length.

If a lot of null points are generated in an antenna irradiation pattern, an antenna gain much fluctuates in dependence on a position of a cellular phone, and hence, a level of a signal received from a base station and a level of a signal transmitted to a base station much fluctuate, resulting in unstable radio-signal transmission condition.

Japanese Patent Application Publication No. 7-283631 has suggested an antenna unit including a radio-signal transceiver arranged in a body, an antenna device extendable from and retractable into the radio-signal transceiver, and a coil which operates as a matching circuit when the antenna device is extended, and operates as a helical antenna when the antenna device is retracted.

Japanese Patent Application Publication No. 2001-339474 has suggested a foldable type cellular phone including a main body, and an antenna matching circuit. The main body is comprised of a first body, and a second body designed pivotable relative to the first body. The antenna matching circuit is designed to have different characteristics in accordance with a length of the cellular phone in a folded state and a length of the cellular phone in a non-folded state.

SUMMARY OF THE INVENTION

In view of the above-mentioned problems in the conventional cellular phones, it is an object of the present invention to provide a cellular phone covering a plurality of frequency bands, which is capable of avoiding generation of null points in an antenna irradiation pattern for accomplishing desired antenna performance.

It is also an object of the present invention to provide a method of operating a cellular phone covering a plurality of frequency bands which method is capable of doing the same.

In a cellular phone, since an antenna is arranged in a small body, a current runs also through the body. As a result, the body acts as a part of an antenna. Hence, impedance characteristic and antenna irradiation pattern are varied in comparison with designed ones.

In addition, a cellular phone originally has a factor causing a loss to an antenna. A cellular phone includes a circuit part which is composed of non-metal, in its body. This results in that the circuit part would cause a loss when an antenna current runs into the body of the cellular phone.

With respect to a hand-held type cellular phone, a user holds a body of the cellular phone with his hand during making communication. Hence, if an antenna current runs through the body, a user's hand causes a loss.

In view of the above-mentioned matters, a body of a cellular phone has to be taken into consideration when an antenna of a cellular phone is designed. The present invention is based on this discovery.

In one aspect of the present invention, there is provided a cellular phone covering a plurality of frequency bands, including (a) an antenna, (b) a high-frequency circuit, (c) an antenna-matching circuit electrically connecting in series between the antenna and the high-frequency circuit, and (d) a first unit which varies a ground length in accordance with a frequency band in which the cellular phone makes communication with others, the ground length being defined as a length of a ground area for the antenna-matching circuit.

The first unit may be comprised of (d1) a detector which detects a frequency band in which the cellular phone makes communication with others, and transmits a detection signal indicative of the thus detected frequency band, and (d2) a second unit which receives the detection signal, and varies the ground length in accordance with a frequency band indicated in the detection signal.

The cellular phone may be designed to further include a first printed substrate, in which case, the second unit may be comprised of a first switch formed on the first printed substrate, wherein the first switch is grounded when the detection signal indicates a first frequency band, and makes an impedance circuit when the detection signal indicates a second frequency band greater than the first frequency band.

The second unit may further include a first inductance, in which case, the first switch is electrically connected to the first inductance to thereby make the impedance circuit when the detection signal indicates the second frequency band.

The first switch may be comprised of an electrically controllable switch which is automatically grounded or automatically makes the impedance circuit in accordance with a frequency band indicated in the detection signal.

The cellular phone may further include first to N-th printed substrates wherein N is a positive integer equal to or greater than two, in which case, the second unit may be comprised of first to N-th switches formed on the first to N-th printed substrates, respectively, the first to N-th switches operate in synchronization with one another, and the first to N-th switches are grounded when the detection signal indicates a first frequency band, and make an impedance circuit when the detection signal indicates a second frequency band greater than the first frequency band.

The second unit may further include first to N-th inductances, in which case, the first to N-th switches are electrically connected to the first to N-th inductances, respectively, to thereby make the impedance circuit when the detection signal indicates the second frequency band.

Each of the first to N-th switches may be comprised of an electrically controllable switch which is automatically grounded or automatically makes the impedance circuit in accordance with a frequency band indicated in the detection signal.

The first to N-th switches may be electrically connected to one another through a cable to which the detection signal is transmitted such that the first to N-th switches operate in synchronization with one another.

For instance, the cellular phone is of a straight type or a slide type.

The cellular phone may be comprised of a first body, and a second body mechanically connected to the first body through a hinge such that the second body is rotatable at an end thereof relative to the first body, in which case, the cellular phone may further include a first printed substrate arranged in the first body, and a second printed substrate arranged in the second body, the second unit may further include a first switch formed on the first printed substrate, and a second switch formed on the second printed substrate and is driven in synchronization with the first switch, and it is preferable that the first and second switches are grounded when the detection signal indicates a first frequency band, and make an impedance circuit when the detection signal indicates a second frequency band greater than the first frequency band.

The second unit may further include first and second inductances, in which case, the first and second switches are electrically connected to the first and second inductances, respectively, to thereby make the impedance circuit when the detection signal indicates the second frequency band.

Each of the first and second switches is comprised of an electrically controllable switch which is automatically grounded or automatically makes the impedance circuit in accordance with a frequency band indicated in the detection signal.

It is preferable that the first and second switches are electrically connected to each other through a cable to which the detection signal is transmitted such that the first and second switches operate in synchronization with each other.

The cellular phone may be comprised of a first body, and a second body mechanically connected to the first body through a hinge such that the second body is rotatable at an end thereof relative to the first body, in which case, the first unit may be comprised of (d1) a detector which detects whether the first and second bodies are open or closed to each other, and transmits a second detection signal indicative of the detection of the second detector, and (d2) a second unit which receives the detection signal, and varies the ground length in accordance with the detection of the second detector.

The second unit may further include first and second inductances, in which case, the first and second switches are electrically connected to the first and second inductances, respectively, to thereby make the impedance circuit when the detection signal indicates the second frequency band.

Each of the first and second switches may be comprised of an electrically controllable switch which is automatically grounded or automatically makes the impedance circuit in accordance with a frequency band indicated in the detection signal.

It is preferable that the first and second switches are electrically connected to each other through a cable to which the detection signal is transmitted such that the first and second switches operate in synchronization with each other.

In another aspect of the present invention, there is provided a method of operating a cellular phone covering a plurality of frequency bands, including the steps of (a) detecting a frequency band in which the cellular phone makes communication with others, and (b) varying a ground length in accordance with the frequency band detected in the step (a), the ground length being defined as a length of a ground area for an antenna-matching circuit of the cellular phone.

The cellular phone includes a first printed substrate, and a first switch formed on the first printed substrate, in which case, the method may further include the step of grounding the first switch when the cellular phone makes communication in a first frequency band, and causing the first switch to make an impedance circuit when the cellular phone makes communication in a second frequency band greater than the first frequency band.

The cellular phone further includes a first inductance, in which case, the method may further include the step of electrically connecting the first switch to the first inductance to thereby make the impedance circuit.

The cellular phone further includes first to N-th printed substrates wherein N is a positive integer equal to or greater than two, and first to N-th switches formed on the first to N-th printed substrates, respectively, and the first to N-th switches operate in synchronization with one another, in which case, the method may further include the step of grounding the first to N-th switches when the cellular phone makes communication in a first frequency band, and causing the first to N-th switches to make an impedance circuit when the cellular phone makes communication in a second frequency band greater than the first frequency band.

The cellular phone further includes first to N-th inductances, in which case, the method may further include the step of electrically connecting the first to N-th switches to the first to N-th inductances, respectively, to thereby make the impedance circuit.

There is further provided a method of operating a cellular phone covering a plurality of frequency bands, the cellular phone being comprised of a first body, and a second body mechanically connected to the first body through a hinge such that the second body is rotatable at an end thereof relative to the first body, the method including the steps of (a) detecting whether the first and second bodies are open or closed to each other, and (b) varying a ground length in accordance with the result of the step (a), the ground length being defined as a length of a ground area for an antenna-matching circuit of the cellular phone.

The cellular phone includes a first printed substrate arranged in the first body, a first switch formed on the first printed substrate, a second printed substrate arranged in the second body, and a second switch formed on the second printed substrate, in which case, the method may further include the step of grounding the first and second switches when the cellular phone makes communication in a first frequency band, and causing the first and second switches to make an impedance circuit when the cellular phone makes communication in a second frequency band greater than the first frequency band.

The cellular phone further includes first and second inductances, in which case, the method may further include the step of electrically connecting the first and second switches to the first and second inductances, respectively, to thereby make the impedance circuit.

In still another aspect of the present invention, there is provided a program for causing a computer to carry out a method of operating a cellular phone covering a plurality of frequency bands, processing executed by the computer in accordance with the program including (a) detecting a frequency band in which the cellular phone makes communication with others, and (b) varying a ground length in accordance with the frequency band detected in the processing (a), the ground length being defined as a length of a ground area for an antenna-matching circuit of the cellular phone.

There is further provided a program for causing a computer to carry out a method of operating a cellular phone covering a plurality of frequency bands, the cellular phone being comprised of a first body, and a second body mechanically connected to the first body through a hinge such that the second body is rotatable at an end thereof relative to the first body, processing executed by the computer in accordance with the program including (a) detecting whether the first and second bodies are open or closed to each other, and (b) varying a ground length in accordance with the result of the step (a), the ground length being defined as a length of a ground area for an antenna-matching circuit of the cellular phone.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 1:
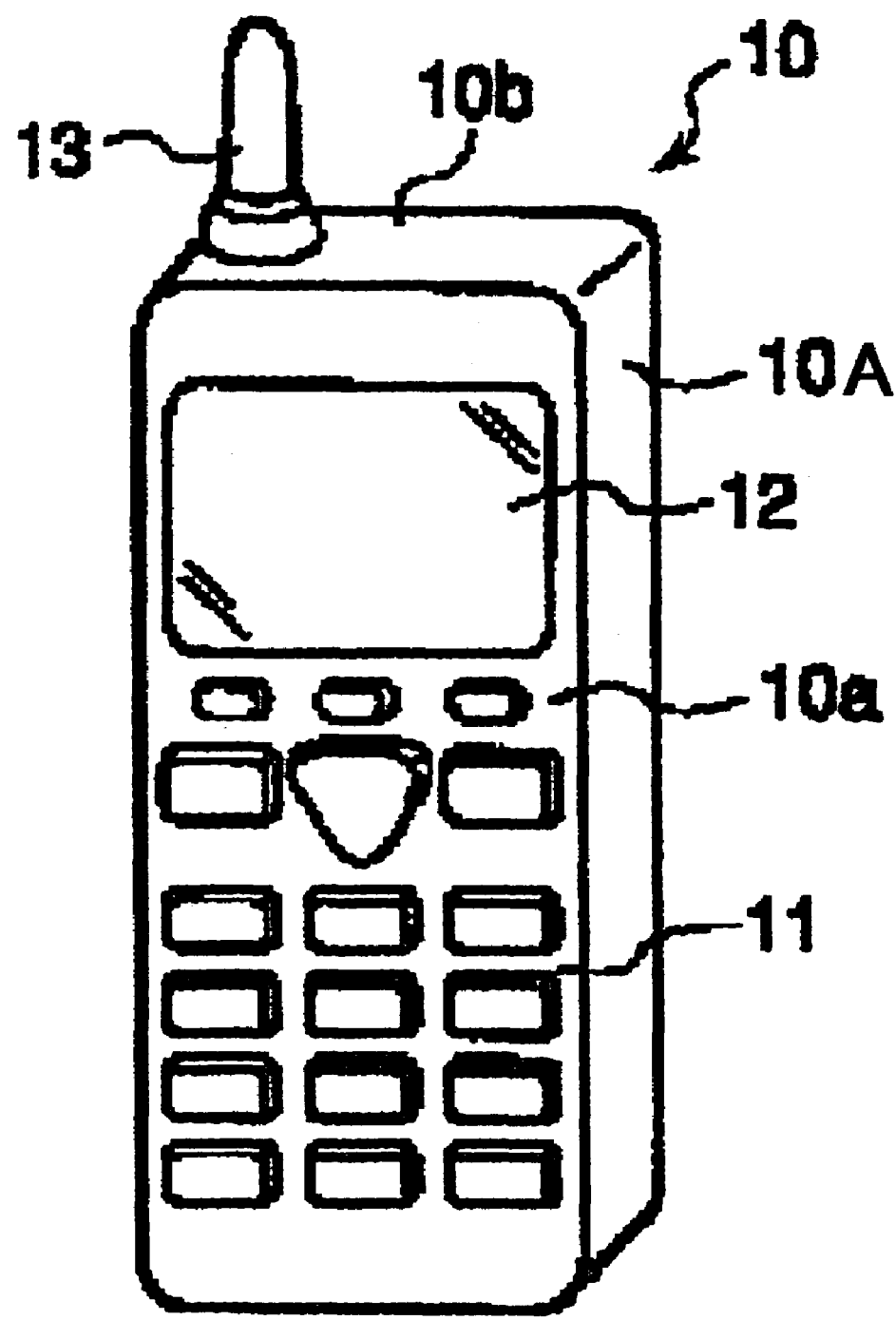
FIG. 1 is a-perspective view of a cellular phone in accordance with the first embodiment of the present invention.

FIG. 1 is a perspective view of a cellular phone 10 in accordance with the first embodiment of the present invention.

The cellular phone 10 in accordance with the present invention is of a straight type.

The cellular phone 10 has a cubic body 10A. On an upper surface 10a of the cubic body 10A are arranged a plurality of keys 11 through which a user can input data such as figures or letters into the cellular phone 10, and a display screen 12 in which data a user input or received messages are displayed. On a side surface 10b of the cubic body 10A is mounted an antenna 13.

Figure 2:
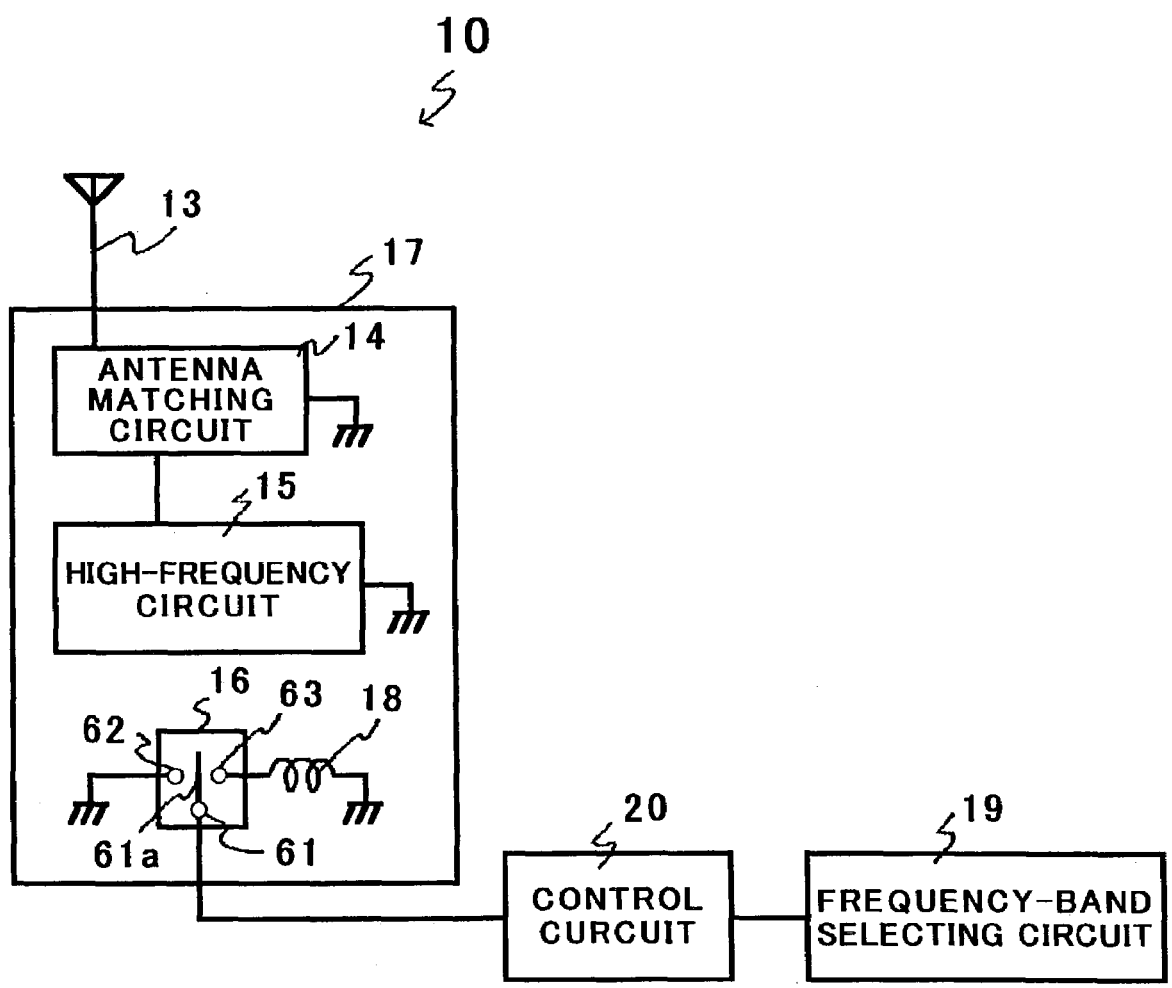
FIG. 2 is a block diagram of the cellular phone illustrated in FIG. 1.

FIG. 2 is a block diagram of the cellular phone 10.

The cellular phone 10 further includes a printed substrate 17 arranged in the body 10A of the cellular phone 10, an antenna matching circuit 14, a high-frequency circuit 15, a high-frequency switch 16, an inductance coil 18, a frequency-band selecting circuit 19, and a control circuit 20.

The antenna matching circuit 14, the high-frequency circuit 15, the high-frequency switch 16 and the inductance coil 18 are all formed on the printed substrate 17.

The antenna matching circuit 14 electrically connects the antenna 13 and the high-frequency circuit 15 to each other. A radio signal produced in the high-frequency circuit 15 is transmitted to the antenna 13 through the antenna matching circuit 14, and then, irradiated from the antenna 13. A radio signal received at the antenna 13 is transmitted to the high-frequency circuit 15 through the antenna matching circuit 14. The antenna matching circuit 14 is electrically connected at a ground area thereof to a ground area of the printed substrate 17, and similarly, the high-frequency circuit 15 is also electrically connected at a grounded area thereof to a ground area of the printed substrate 17.

In the cellular phone 10 in accordance with the first embodiment, a ground surface of the printed substrate 17 is used as an antenna ground.

The high-frequency switch 16 includes a base contact 61, a contact plate 61a designed pivotable around the base contact 61, a first contact 62 and a second contact 63. The base contact 61 is electrically connected to the frequency-band selecting circuit 19 through the control circuit 20. The first contact 62 is electrically connected to a ground area of the printed substrate 17. The second contact 63 is electrically connected to the inductance coil 18 which is electrically connected at one end to a ground area of the printed substrate 17.

The inductance coil 18 has such an inductance that it provides a sufficiently high impedance in a high-frequency band.

The frequency-band selecting circuit 19 selects a frequency band in accordance with a particular key actuated by a user among the keys 11. As an alternative, the frequency-band selecting circuit 19 may be designed to detect a frequency band in which the cellular phone 10 makes communication with others. The frequency-band selecting circuit 19 transmits a signal indicative of a frequency band selected by itself, to the control circuit 20.

On receipt of the signal from the frequency-band selecting circuit 19, the control circuit 20 transmits a control signal to the high-frequency switch 16. In accordance with the control signal, the contact plate 61a makes pivotal movement around the base contact 61 to thereby make electrical contact with the first contact 62 or the second contact 63. The pivotal movement of the contact plate 61a around the base contact 61 between the first and second contacts 62 and 63 causes a ground length in the cellular phone 10 to vary in accordance with a frequency band.

Figure 3:
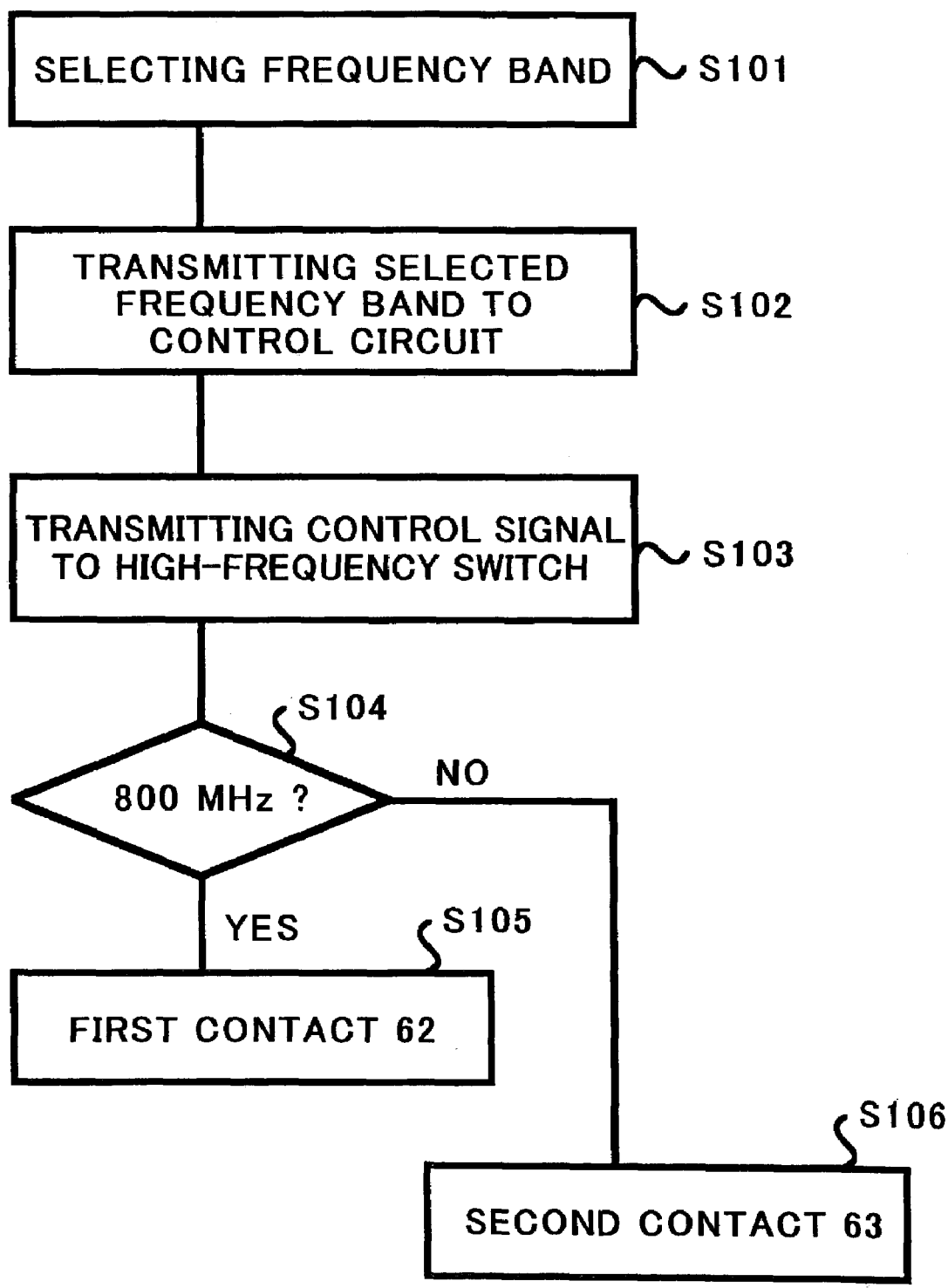
FIG. 3 is a flow chart showing respective steps to be carried out in an operation of the cellular phone illustrated in FIG. 1.

FIG. 3 is a flow chart showing respective steps to be carried out in an operation of the cellular phone 10 in accordance with the first embodiment. Hereinbelow is explained an operation of the cellular phone 10 with reference to FIG. 3.

First, the frequency-band selecting circuit 19 selects a frequency band either in accordance with data input by a user into the cellular phone 10 through a particular key among the keys 11 or by detecting a frequency band in which the cellular phone 10 is making communication, in step S101.

Then, the frequency-band selecting circuit 19 transmits a signal indicative of the selected frequency band, to the control circuit 20, in step S102.

On receipt of the signal from the frequency-band selecting circuit 19, the control circuit 20 transmits a control signal to the high-frequency switch 16, in step S103. The control signal includes indication determined by the control circuit 20 in accordance with the signal transmitted from the frequency-band selecting circuit 19.

Herein, it is assumed that the cellular phone 10 has to cover two frequency bands, 800 MHz band and 2 GHz band.

When the frequency-band selecting circuit 19 selects 800 MHz (YES in step S104), the contact plate 61a is caused to make pivotal movement in a counter clock-wise direction to make electrical contact with the first contact 62, in step S105. Thus, the body 10A of the cellular phone 10 is electrically connected directly to a ground area of the printed substrate 17. As a result, the cellular phone 10 would have a first ground length.

When the frequency-band selecting circuit 19 selects 2 GHz (No in step S104), the contact plate 61a is caused to make pivotal movement in a clock-wise direction to make electrical contact with the second contact 63, in step S106. Thus, the body 10A of the cellular phone 10 is electrically connected to a ground area of the printed substrate 17 through the inductance coil 18. As a result, the cellular phone 10 would have a second ground length smaller than the first ground length.

Thus, it is possible in the cellular phone 10 to switch a length of a ground area with respect to the antenna matching circuit 14.

[Second Embodiment]

Figure 4:
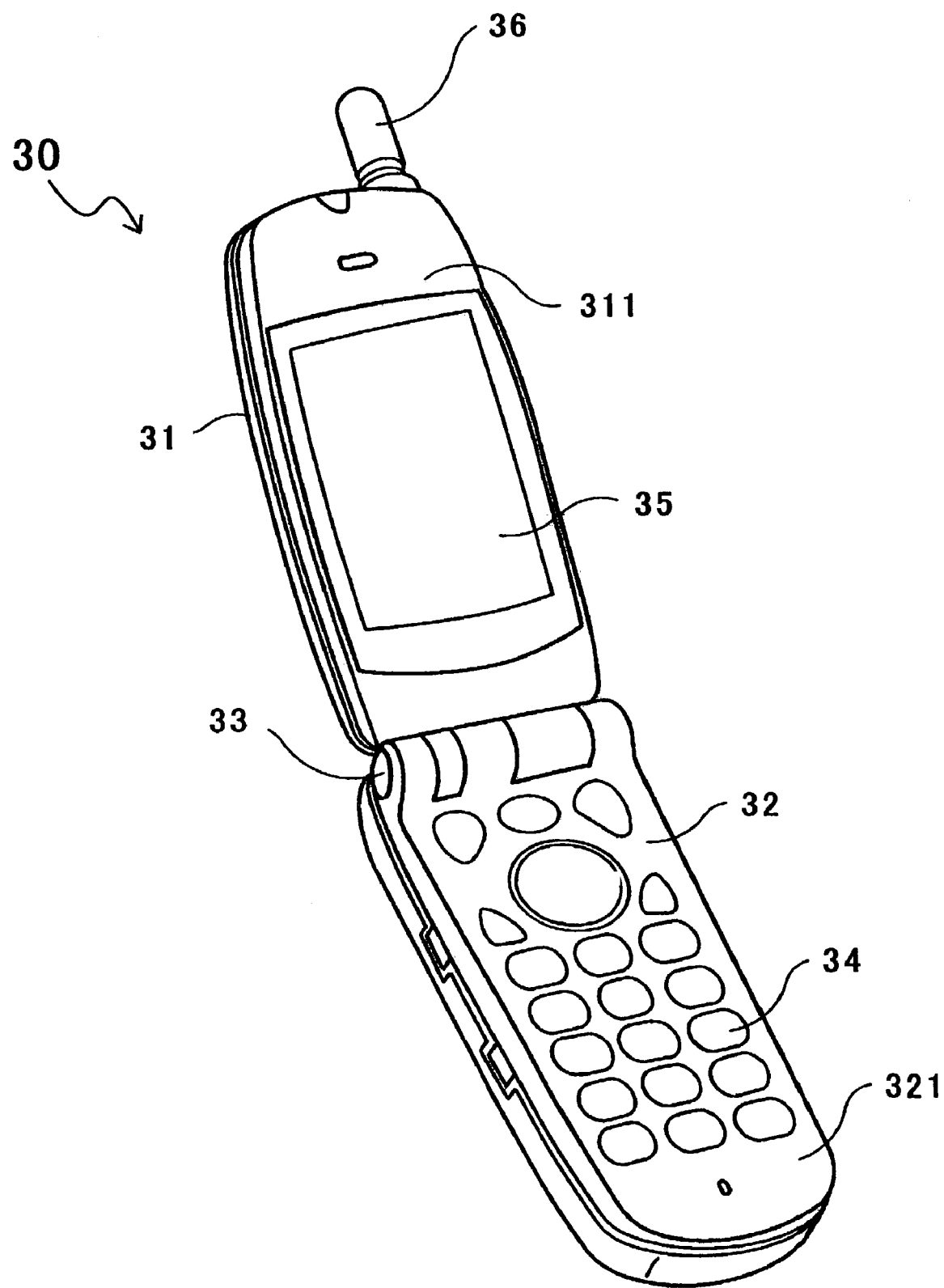
FIGS. 4 and 5 are perspective views of a cellular phone in accordance with the second embodiment of the present invention.
Figure 5:
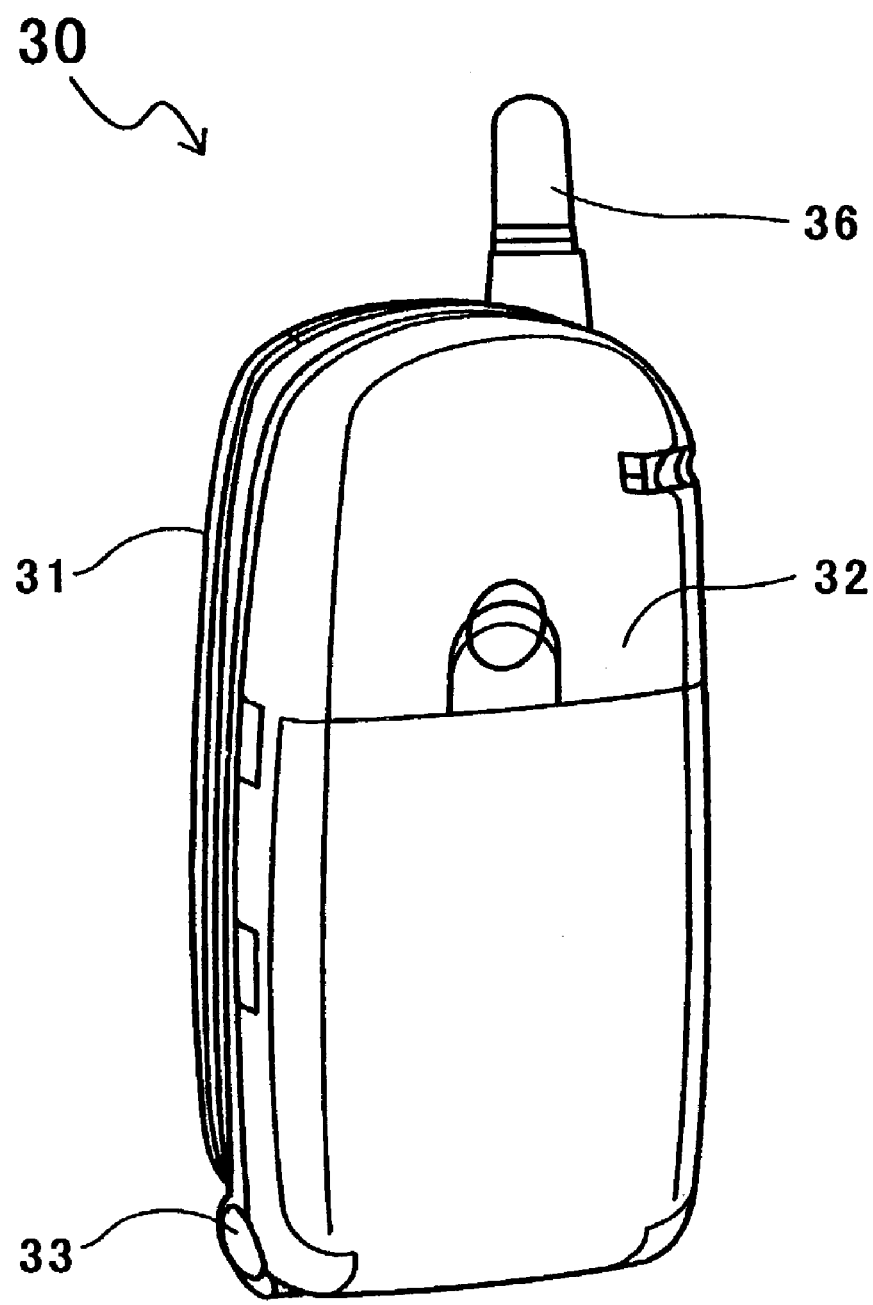

FIGS. 4 and 5 are perspective views of a cellular phone 30 in accordance with the second embodiment of the present invention.

As best illustrated in FIG. 4, the cellular phone 30 is designed to include a first body 31 and a second body 32. The first body 31 is mechanically connected at one end thereof to the second body 32 through a hinge 33 such that the first and second bodies 31 and 32 are rotatable about the hinge 33 to each other. Specifically, the first and second bodies 31 and 32 can have a first position in which they are open to each other as illustrated in FIG. 4, and a second position in which they are closed to each other as illustrated in FIG. 5.

A plurality of keys 34 are arranged on a surface 321 of the second body 32 which surface 321 is located internal when the first and second bodies 31 and 32 are closed to each other. A user can input data into the cellular phone 30 through the keys 14.

A liquid crystal display 15 is arranged at the center of a surface 311 of the first body 31 located internal when the first and second bodies 31 and 32 are closed to each other. On the liquid crystal display 15 are displayed data which a user input through the keys 14, a content of an e-mail having been received, or a telephone number of a person who made a call to the cellular phone 30.

An extendable antenna 36 is mounted on a rear surface of the first body 31.

Figure 6:
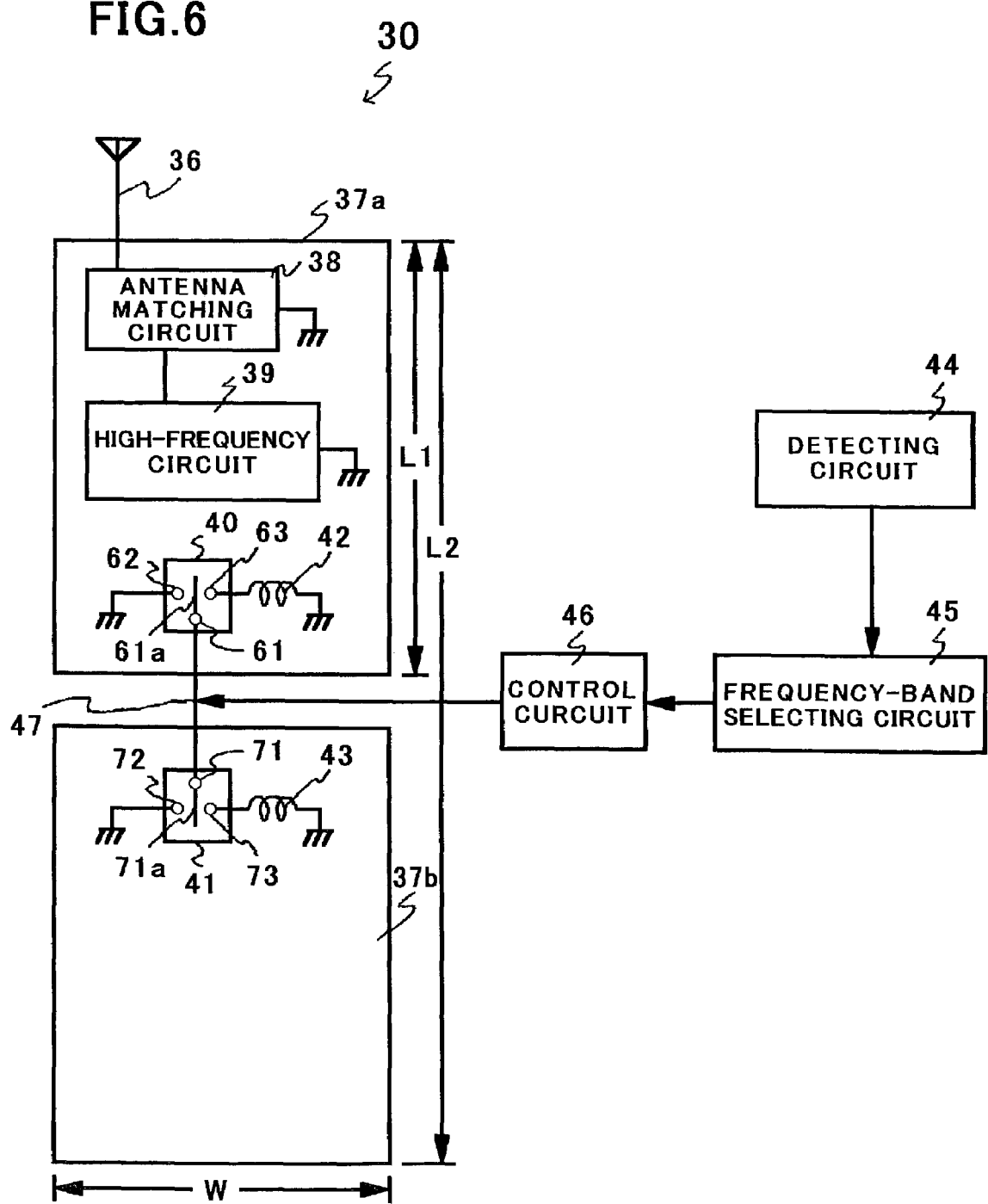
FIG. 6 is a block diagram of the cellular phone illustrated in FIGS. 4 and 5.

FIG. 6 is a block diagram of the cellular phone 30.

The cellular phone 30 further includes a first printed substrate 37a arranged in the first body 31, a second printed substrate 37b arranged in the second body 32, an antenna matching circuit 38, a high-frequency circuit 39, a first high-frequency switch 40, a second high-frequency switch 41, a first inductance coil 42, a second inductance coil 43, a detecting circuit 44, a frequency-band selecting circuit 45, and a control circuit 46.

The antenna matching circuit 38, the high-frequency circuit 39, the first high-frequency switch 40 and the first inductance coil 42 are all formed on the first printed substrate 37a. The second high-frequency switch 41 is formed on the second printed substrate 37b.

The antenna matching circuit 38 electrically connects the antenna 36 and the high-frequency circuit 39 to each other. A radio signal produced in the high-frequency circuit 39 is transmitted to the antenna 36 through the antenna matching circuit 38, and then, irradiated from the antenna 36. A radio signal received at the antenna 36 is transmitted to the high-frequency circuit 39 through the antenna matching circuit 38. The antenna matching circuit 38 is electrically connected at a ground area thereof to a ground area of the first printed substrate 37a, and similarly, the high-frequency circuit 39 is also electrically connected at a grounded area thereof to a ground area of the first printed substrate 37a.

In the cellular phone 30 in accordance with the second embodiment, ground surfaces of the first and second printed substrates 37a and 37b are used as an antenna ground.

The first high-frequency switch 40 includes a base contact 61, a contact plate 61a designed pivotable around the base contact 61, a first contact 62 and a second contact 63. The base contact 61 is electrically connected to the control circuit 46. The first contact 62 is electrically connected to a ground area of the first printed substrate 37a. The second contact 63 is electrically connected at one end to a ground area of the first printed substrate 37a through the inductance coil 42.

The second high-frequency switch 41 includes a base contact 71, a contact plate 71a designed pivotable around the base contact 71, a first contact 72 and a second contact 73. The base contact 71 is electrically connected to the control circuit 46. The first contact 72 is electrically connected to a ground area of the second printed substrate 37b. The second contact 73 is electrically connected at one end to a ground area of the second printed substrate 37b through the inductance coil 43.

Each of the inductance coils 42 and 43 is designed to have such an inductance that they provide a sufficiently high impedance in a high-frequency band.

The base contacts 61 and 71 of the first and second high-frequency switches 40 and 41 are electrically connected to each other through a cable 47. A later mentioned control signal transmitted from the control circuit 46 is applied to the cable 10 and as a result, the first and second high-frequency switches 40 and 41 concurrently operate, or make switching action in synchronization with each other.

For instance, the first and second high-frequency switches 40 and 41 may be mounted in the hinge 33.

The detecting circuit 44 detects a frequency band in which the cellular phone 30 makes communication with others, and transmits a detection signal indicative of the thus detected frequency band, to the frequency-band selecting circuit 45.

On receipt of the detection signal from the detecting circuit 44, the frequency-band selecting circuit 45 selects a desired frequency band, and transmits a selection signal indicative of the thus selected frequency band, to the control circuit 46.

On receipt of the selection signal from the frequency-band selecting circuit 45, the control circuit 46 transmits a control signal to both of the first and second high-frequency switches 40 and 41 through the cable 47. In accordance with the control signal, the contact plates 61a and 71a make pivotal movement around the base contacts 61 and 71 to thereby make electrical contact with the first contact 62, 72 or the second contact 63, 73. The pivotal movement of the contact plates 61a and 71a around the base contacts 61 and 71 between the first and second contacts 62, 72 and 63, 73 causes a ground length in the cellular phone 30 to vary in accordance with a frequency band.

Figure 7:
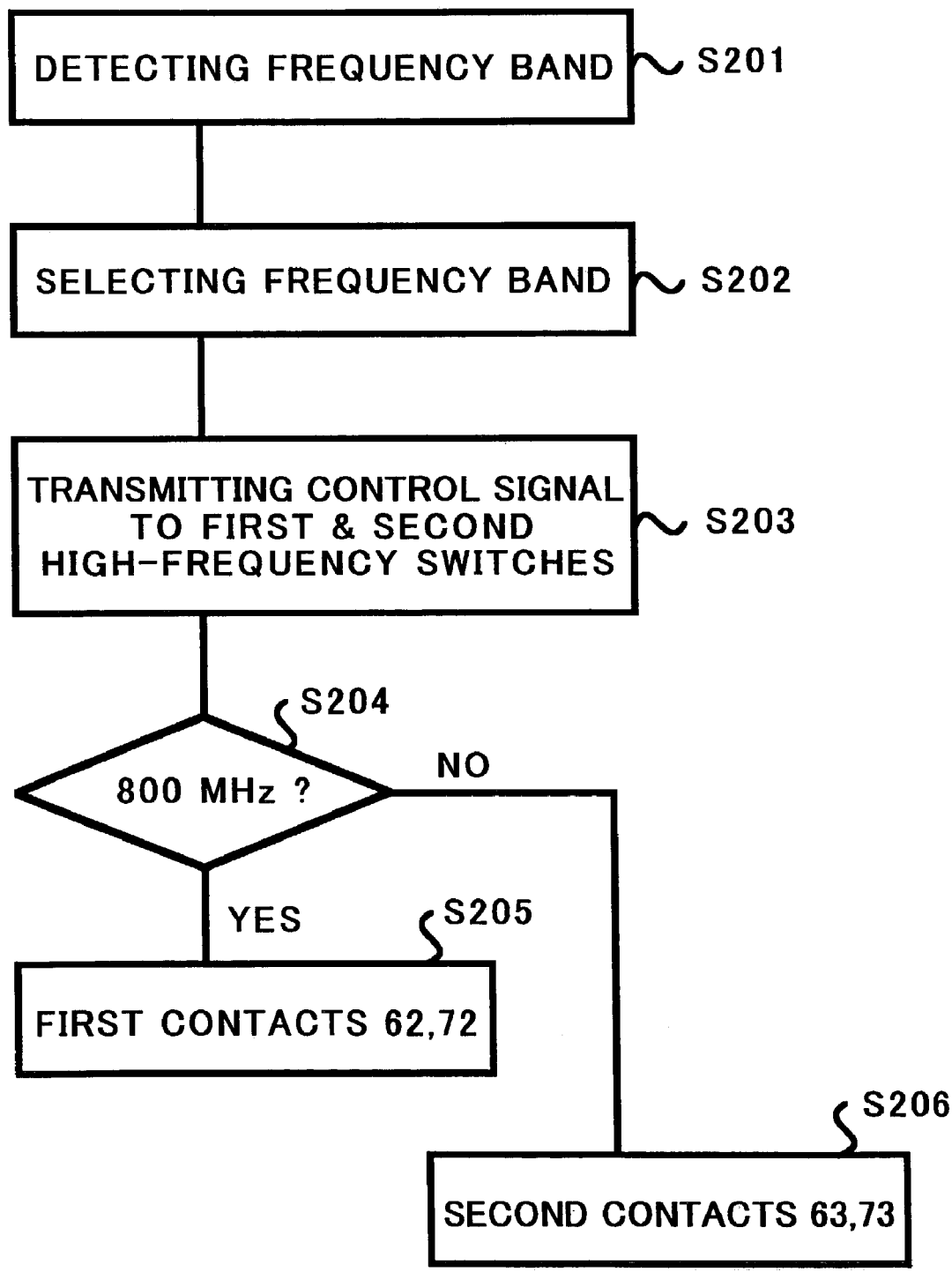
FIG. 7 is a flow chart showing respective steps to be carried out in an operation of the cellular phone illustrated in FIGS. 4 and 5.

FIG. 7 is a flow chart showing respective steps to be carried out in an operation of the cellular phone 30 in accordance with the second embodiment. Hereinbelow is explained an operation of the cellular phone 30 with reference to FIG. 7.

First, the detecting circuit 44 detects a frequency band in which the cellular phone 30 is making communication with another phone, in step S201. Then, the detecting circuit 44 transmits a detection signal indicative of the thus selected frequency band.

Then, the frequency-band selecting circuit 45 selects a desired frequency band in accordance with the frequency band indicated in the detection signal received from the detecting circuit 44, in step S202.

Herein, it is assumed that the cellular phone 30 has to cover two frequency bands, 800 MHz band and 2 GHz band.

For instance, if the frequency band detected by the detecting circuit 44 or indicated in the detection signal is closer to 800 MHz, the frequency-band selecting circuit 45 selects 800 MHz, and transmits a selection signal indicative of 800 MHz.

Then, the frequency-band selecting circuit 45 transmits a selection signal indicative of the thus selected frequency band, to the control circuit 46.

On receipt of the selection signal from the frequency-band selecting circuit 45, the control circuit 46 transmits a control signal to the first and second high-frequency switches 40 and 41 through the cable 47, in step S203. The control signal includes indication determined by the control circuit 46 in accordance with the selection signal transmitted from the frequency-band selecting circuit 45.

When the frequency-band selecting circuit 45 selects 800 MHz (YES in step S204), the contact plate 61a is caused to make pivotal movement in a counter clock-wise direction to make electrical contact with the first contact 62, and the contact plate 71a is caused to make pivotal movement in a clock-wise direction to make electrical contact with the first contact 72, in step S205. Thus, the first body 31 of the cellular phone 30 is electrically connected directly to a ground area of the first printed substrate 37a, and the second body 32 of the cellular phone 30 is electrically connected directly to a ground area of the second printed substrate 37b.

As a result, the cellular phone 30 would have a ground length defined as L2 illustrated in FIG. 6.

When the frequency-band selecting circuit 45 selects 2 GHz (No in step S204), the contact plate 61a is caused to make pivotal movement in a clock-wise direction to make electrical contact with the second contact 63, and the contact plate 71a is caused to make pivotal movement in a counter clock-wise direction to make electrical contact with the second contact 73, in step S206. Thus, the first body 31 of the cellular phone 30 is electrically connected to a ground area of the first printed substrate 37a through the first inductance coil 42, and the second body 32 of the cellular phone 30 is electrically connected to a ground area of the second printed substrate 37b through the second inductance coil 43. Since the first and second inductance coils 42 and 43 have a sufficiently high impedance in a high frequency band, the ground areas of the first and second printed substrates 37a and 37b are not electrically connected to each other in a high-frequency band.

As a result, the cellular phone 30 would have a ground length defined as L1 smaller than the ground length L2.

The first and second high-frequency switches 40 and 41 may be comprised of a mechanical switch or an electrical switch. For instance, if each of the first and second high-frequency switches 40 and 41 is comprised of an electrically controllable switch, the first and second high-frequency switches 40 and 41 can be caused to automatically operate to thereby vary a ground length of the cellular phone 30, by detecting a frequency band of a radio signal received at the antenna 36.

Thus, it is possible in the cellular phone 30 to switch a length of a ground area with respect to the antenna matching circuit 38.

As mentioned above, in the foldable type cellular phone 30, since a body is divided into two bodies (specifically, the first and second bodies 37a and 37b) and a printed substrate is divided into two substrates (specifically, the first and second printed substrates 37a and 37b) both about the hinge 33. Hence, it is possible in the foldable type cellular phone 30 to electrically connect the two bodies or ground areas of the two substrates to each other or not to electrically connect them to each other by making use of the hinge 33. As a result, it is possible to vary a ground length defined with the antenna 36 being considered as a reference point, and hence, accomplish an optimal ground length for each of frequency bands, ensuring desired characteristics of the antenna 36 which can prevent generation of null points.

Though the cellular phone 30 in accordance with the second embodiment is designed to have the circuitry illustrated in FIG. 6, the cellular phone 30 may be designed to have the circuitry illustrated in FIG. 2. Similarly, the cellular phone 10 in accordance with the first embodiment may be designed to have the circuitry illustrated in FIG. 6 in place of the circuitry illustrated in FIG. 2.

The cellular phone 30 in accordance with the second embodiment may be designed to include a circuit for detecting whether the first and second bodies 31 and 32 are open or closed to each other, in place of the detecting circuit 44. In the case, the frequency-band selecting circuit 45 is designed to select a desired frequency band in accordance with a signal transmitted from the circuit which signal is indicative of whether the first and second bodies 31 and 32 are open or closed to each other.

[Third Embodiment]

Figure 8A:
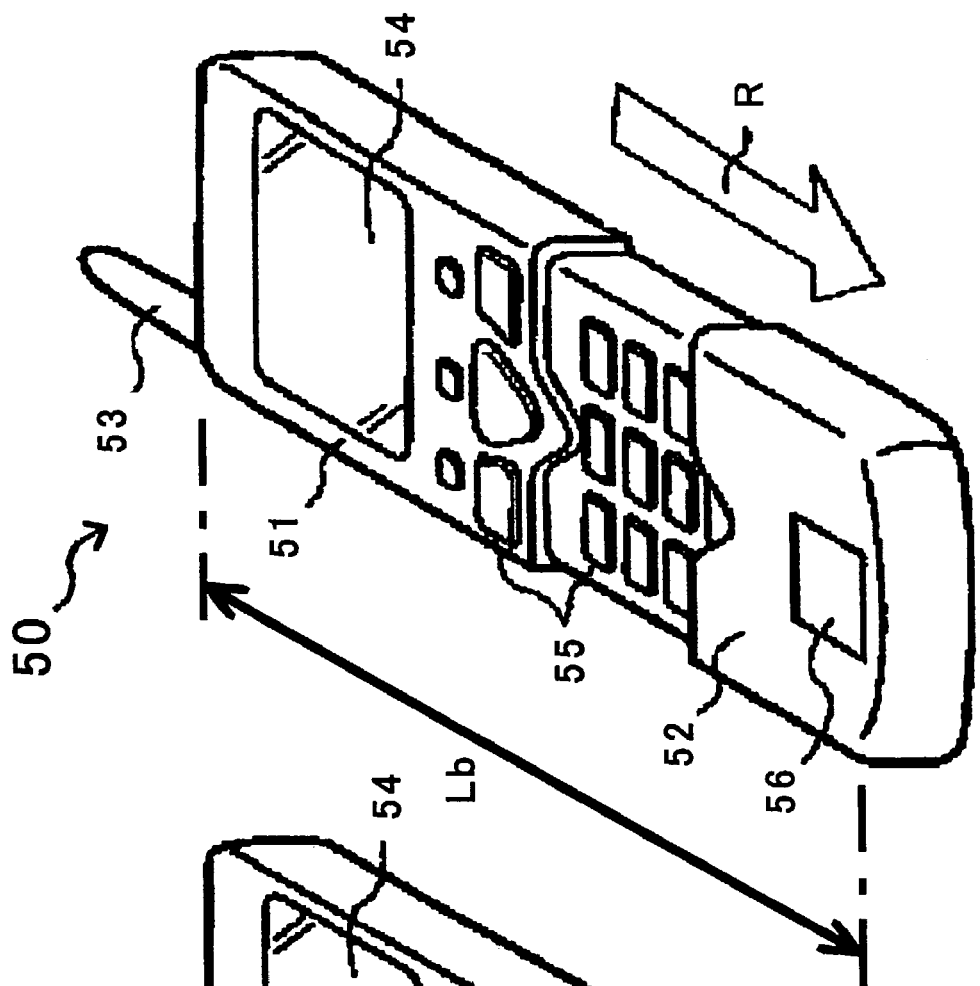
FIGS. 8A and 8B are perspective views of a cellular phone in accordance with the third embodiment of the present invention.
Figure 8B:
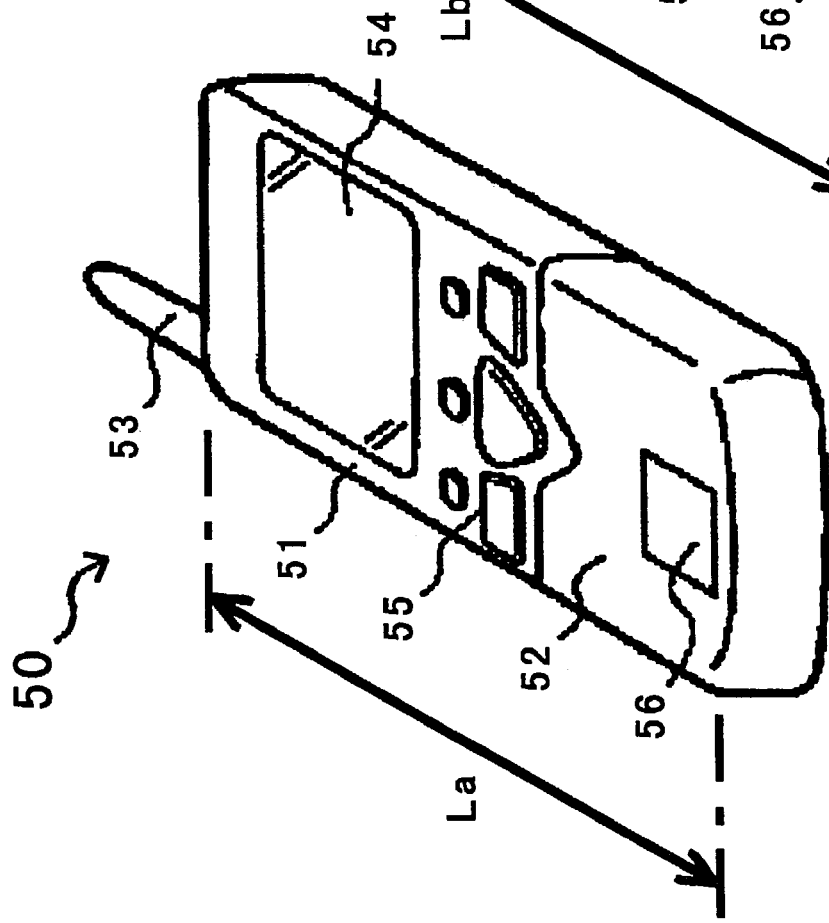

FIGS. 8A and 8B are perspective views of a cellular phone 50 in accordance with the third embodiment.

The cellular phone 50 is of a slide type.

The cellular phone 50 is comprised of a principal body 51 and a slide body 52 designed slidable relative to the principal body 51.

The principal body 51 includes an antenna 53, a liquid crystal display 54, and a plurality of keys 55 some of which appear only when the slide body 52 is slid relative to the principal body 51 in a direction R. The slide body 52 has a microphone 56.

The slide body 52 is formed hollow, and thus, the principal body 51 can be inserted partially into the slide body 52, as illustrated in FIG. 8A. In addition, the slide body 52 is designed slidable relative to the principal body 51, as illustrated in FIG. 8B. Specifically, the slide body 52 can have a first position in which the principal body 51 is inserted into the slide body 52, and hence, the cellular phone 50 has a longitudinal length of La, and a second position in which the slide body 52 is slid relative to the principal body 51 in the direction R, and hence, the cellular phone 50 has a longitudinal length Lb longer than the length La.

The cellular phone 50 may be designed to have the same internal circuitry as that of the cellular phone 30 illustrated in FIG. 6. When the slide body 52 is in the first position illustrated in FIG. 8A, the cellular phone 50 has a ground length of L1, whereas when the slide body 52 is in the second position illustrated in FIG. 8B, the cellular phone 50 has a ground length of L2 longer than the ground length L1.

As is obvious in view of the explanation made above, even if the cellular phone 50 is designed to be of a slide type, it can have the same functions as those of the cellular phone 30 which is of a foldable type.

An operation of the frequency-band selecting circuit 19 and the control circuit 20 in the cellular phone 10, and the detecting circuit 44, the frequency-band selecting circuit 45 and the control circuit 46 in the cellular phone 30 can be accomplished by a computer program written in a language readable by a computer.

For operating the frequency-band selecting circuit 19 and the control circuit 20 in the cellular phone 10, and the detecting circuit 44, the frequency-band selecting circuit 45 and the control circuit 46 in the cellular phone 30 by means of a computer program, the cellular phones 10 and 30 are designed to include a memory to store a computer program therein, and a central processing unit, for instance. The computer program is stored in the memory, and is read out into the central processing unit when the central processing unit starts its operation. Thus, such an operation of the cellular phones 10 and 30 as mentioned above is accomplished in accordance with the computer program.

As an alternative, a recording medium storing such a computer program as mentioned above may be set into the central processing unit to be read out by the central processing unit.

The functions accomplished by a computer program are defined by various commands, and may be presented through a recording medium readable by a computer.

In the specification, the term "recording medium" means any medium which can record data therein.

The term "recording medium" includes, for instance, a disk-shaped recorder such as CD-ROM (Compact Disk-ROM) or PD, a magnetic tape, MO (Magneto Optical Disk), DVD-ROM (Digital Video Disk-Read. Only Memory), DVD-RAM (Digital Video Disk-Random Access Memory), a floppy disk, a memory chip 404 such as RAM (Random Access Memory) or ROM (Read Only Memory), EPROM (Erasable Programmable Read Only Memory), EEPROM (Electrically Erasable Programmable Read Only Memory), smart media (Registered Trade Mark), a flush memory, a rewritable card-type ROM such as a compact flush card, a hard disk 403, and any other suitable means for storing a program therein.

A recording medium storing a program for accomplishing the above-mentioned apparatus may be accomplished by programming functions of the above-mentioned apparatuses with a programming language readable by a computer, and recording the program in a recording medium such as mentioned above.

A hard disc equipped in a server may be employed as a recording medium. It is also possible to accomplish the recording medium in accordance with the present invention by storing the above-mentioned computer program in such a recording medium as mentioned above, and reading the computer program by other computers through a network.

The advantages obtained by the aforementioned present invention will be described hereinbelow.

In accordance with the present invention, a ground length for an antenna matching circuit is varied to thereby prevent generation of null points in an antenna irradiation pattern in a plurality of frequency bands different from each other. In particular, a foldable type cellular phone such as the cellular phone 30 in accordance with the second embodiment can switch a ground length by detecting whether first and second bodies thereof are open or closed to each other.

Figure 9B:
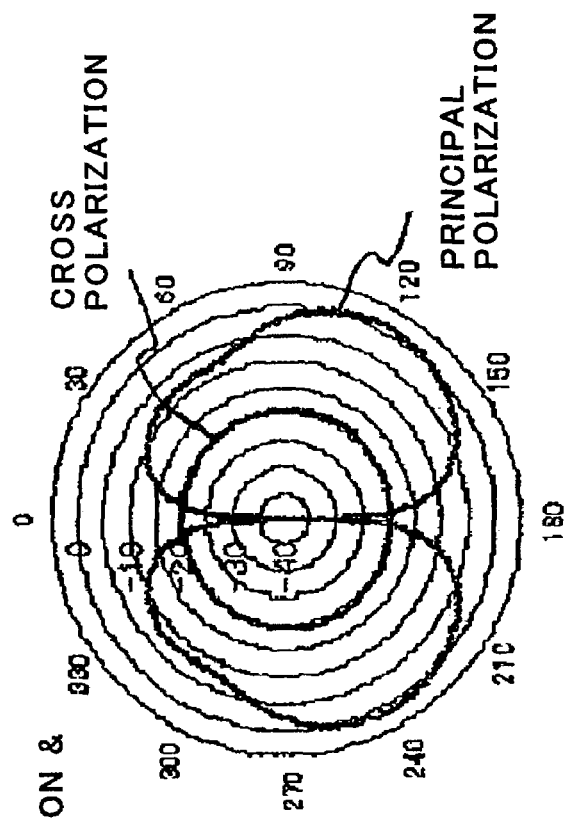
FIGS. 9A and 9B illustrate the results of antenna irradiation pattern simulation having been carried out in a certain condition.
Figure 9A:
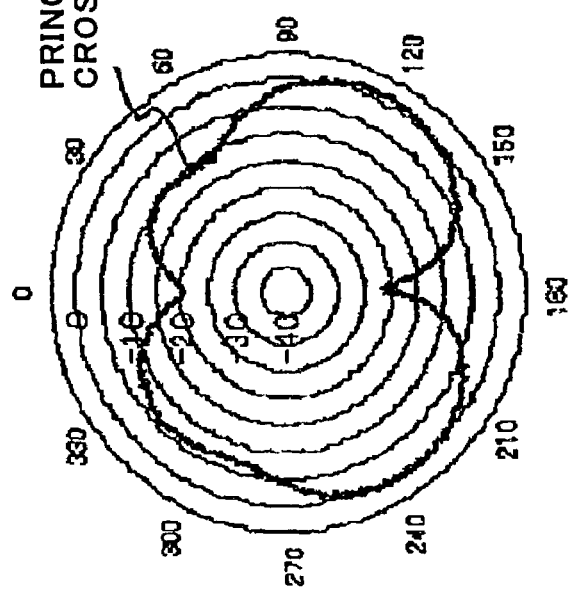

FIGS. 9A and 9B illustrate the results of antenna irradiation pattern simulation having been carried out using a $\lambda/4$ element, wherein ground lengths were 170 mm and 50 mm, and a frequency band was 880 MHz.

Figure 10B:
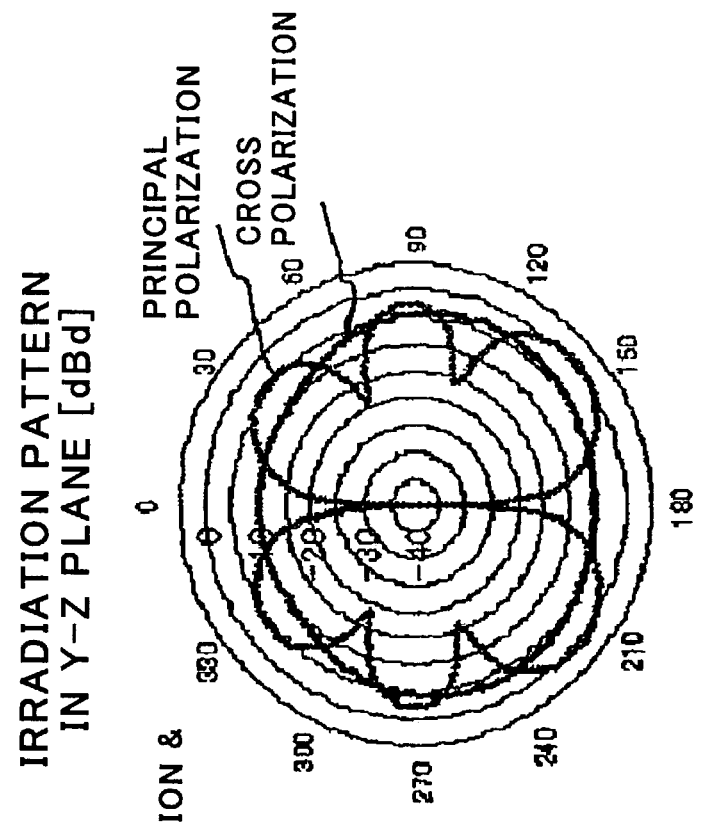
FIGS. 10A and 10B illustrate the results of antenna irradiation pattern simulation having been carried out in another certain condition.
Figure 10A:
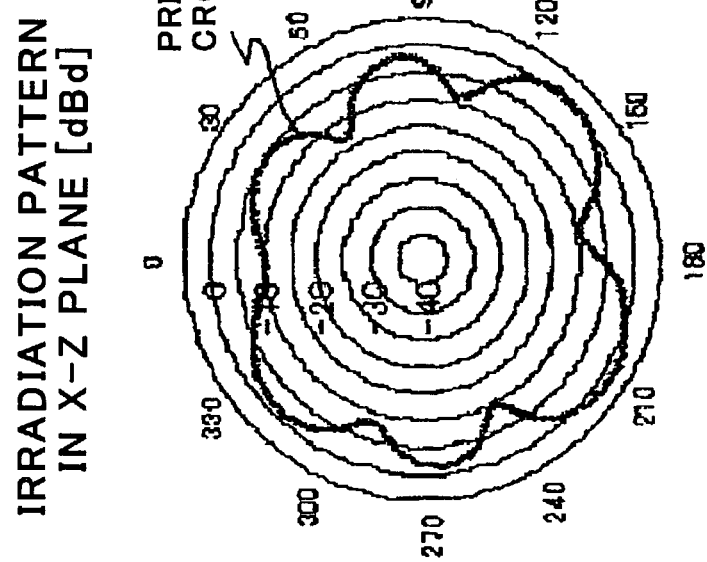

FIGS. 10A and 10B illustrate the results of antenna irradiation pattern simulation having been carried out using a $\lambda/4$ element, wherein ground lengths were 170 mm and 50 mm, and a frequency band was 2 GHz.

Figure 11B:
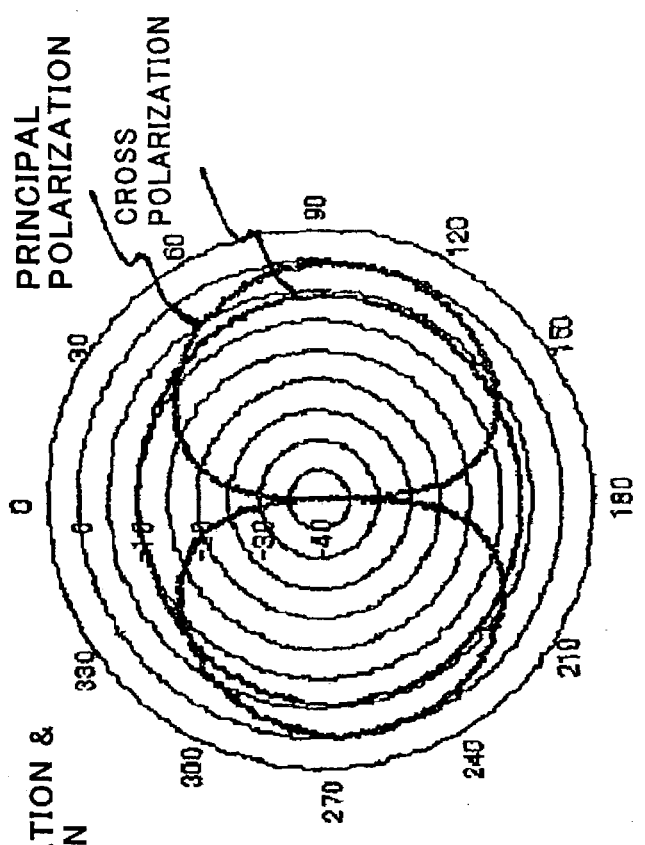
FIGS. 11A and 11B illustrate the results of antenna irradiation pattern simulation having been carried out in another certain condition.
Figure 11A:
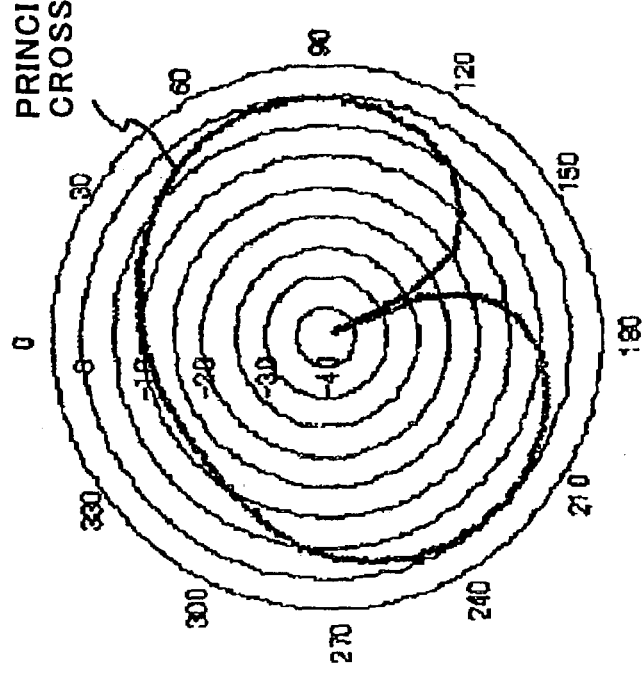

FIGS. 11A and 11B illustrate the results of antenna irradiation pattern simulation having been carried out using a $\lambda/4$ element, wherein ground lengths were 50 mm and 50 mm, and a frequency band was 2 GHz.

Comparing the results of FIGS. 9A and 9B to the results of FIGS. 10A and 10B in both of which the ground lengths are set equal to each other, the greater number of null points can be seen in FIGS. 10A and 10B than in FIGS. 9A and 9B, that is, the greater number of null points generate in a higher frequency band.

Comparing the results of FIGS. 10A and 10B to the results of FIGS. 11A and 11B in both of which the frequency band is set equal to each other, the greater number of null points can be seen in FIGS. 10A and 10B than in FIGS. 11A and 11B, that is, the greater number of null points generate in a longer ground length. In FIGS. 11A and 11B wherein the ground length is set shorter than the same in the simulation illustrated in FIGS. 10A and 10B, no null points can be seen.

As will be obvious in view of the comparison among FIGS. 9A to 11B, the present invention makes it possible to prevent generation of null points by selecting a higher frequency band and/or selecting a shorter ground length.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2002-139141 filed on May 14, 2002 including specification, claims, drawings and summary is incorporated herein by reference in its entirety.

What is claimed is:

1. A cellular phone covering a plurality of frequency bands, comprising:
 (a) an antenna;
 (b) a high-frequency circuit;
 (c) an antenna-matching circuit electrically connecting in series between said antenna and said high-frequency circuit;
 (d) a first unit which varies a ground length connection to a ground area in accordance with a frequency band in which said cellular phone makes communication with others, wherein said ground area is a ground area of said antenna-matching circuit;
wherein said first unit comprises:
(d1) a detector which detects a frequency band in which said cellular phone makes communication with others, and transmits a detection signal indicative of the thus detected frequency band; and
(d2) a second unit which receives said detection signal, and varies said ground length connection to the around area in accordance with a frequency band indicated in the detection signal; and
first to N-th printed substrates wherein N is a positive integer equal to or greater than two, wherein said second unit is comprised of first to N-th switches formed on said first to N-th printed substrates, respectively, said first to N-th switches operate in synchronization with one another, said first to N-th switches are grounded when said detection signal indicates a first frequency band, and make an impedance circuit when said detection signal indicates a second frequency band greater than said first frequency band.

2. The cellular phone as set forth in claim 1 further comprising a first printed substrate, and wherein said second unit is comprised of a first switch formed on said first printed substrate, wherein said first switch connects to the ground area which has a first ground length when said detection signal indicates a first frequency band, and makes an impedance circuit connection to the ground area which has a second ground length when said detection signal indicates a second frequency band greater than said first frequency band.

3. The cellular phone as set forth in claim 2, wherein said second unit further includes a first inductance, and wherein said first switch is electrically connected to said first inductance to thereby make said impedance circuit when said detection signal indicates said second frequency band.

4. The cellular phone as set forth in claim 2, wherein said first switch is comprised of an electrically controllable switch which is automatically connected to the ground area which has a first ground length, or automatically makes said impedance circuit connection in accordance with a frequency band indicated in said detection signal.

5. The cellular phone as set forth in claim 1, wherein said second unit further includes first to N-th inductances, and wherein said first to N-th switches are electrically connected to said first to N-th inductances, respectively, to thereby make said impedance circuit when said detection signal indicates said second frequency band.

6. The cellular phone as set forth in claim 1, wherein each of said first to N-th switches is comprised of an electrically controllable switch which is automatically grounded or automatically makes said impedance circuit in accordance with a frequency band indicated in said detection signal.

7. The cellular phone as set forth in claim 1 wherein said first to N-th switches are electrically connected to one another through a cable to which said detection signal is transmitted such that said first to N-th switches operate in synchronization with one another.

8. The cellular phone as set forth in claim 1, wherein said cellular phone is of a straight type or a slide type.

9. A cellular phone covering a plurality of frequency bands, comprising:
(a) an antenna;
(b) a high-frequency circuit;
(c) an antenna-matching circuit electrically connecting in series between said antenna and said high-frequency circuit;
(d) a first unit which varies a ground length connection to a ground area in accordance with a freciuency band in which said cellular phone makes communication with others, wherein said ground area is a ground area of said antenna-matching circuit; wherein said first unit comprises:
(d1) a detector which detects a frequency band in which said cellular phone makes communication with others, and transmits a detection signal indicative of the thus detected freciuency band; and
(d2) a second unit which receives said detection signal, and varies said ground length connection to the ground area in accordance with a frequency band indicated in the detection signal;
wherein said cellular phone is comprised of a first body, and a second body mechanically connected to said first body through a hinge such that said second body is rotatable at an end thereof relative to said first body, said cellular phone further includes a first printed substrate arranged in said first body, and a second printed substrate arranged in said second body, said second unit further includes a first switch formed on said first printed substrate, and a second switch formed on said second printed substrate and is driven in synchronization with said first switch, and said first and second switches are grounded when said detection signal indicates a first frequency band, and make an impedance circuit when said detection signal indicates a second frequency band greater than said first frequency band.

10. The cellular phone as set forth in claim 9, wherein said second unit further includes first and second inductances, and wherein said first and second switches are electrically connected to said first and second inductances, respectively, to thereby make said impedance circuit when said detection signal indicates said second frequency band.

11. The cellular phone as set forth in claim 9, wherein each of said first and second switches is comprised of an electrically controllable switch which is automatically grounded or automatically makes said impedance circuit in accordance with a frequency band indicated in said detection signal.

12. The cellular phone as set forth in claim 9, wherein said first and second switches are electrically connected to each other through a cable to which said detection signal is transmitted such that said first and second switches operate in synchronization with each other.

13. A cellular phone covering a plurality of frequency bands. comprising:
(a) an antenna:
(b) a high-frequency circuit:
(c) an antenna-matching circuit electrically connecting in series between said antenna and said high-frequency circuit; and
(d) a first unit which varies a ground length connection to a ground area in accordance with a frequency band in which said cellular phone makes communication with others, wherein said ground area is a ground area of said antenna-matching circuit;
wherein said cellular phone is comprised of a first body, and a second body mechanically connected to said first body through a hinge such that said second body is rotatable at an end thereof relative to said first body, said first unit comprising;
(d1) a detector which detects whether said first and second bodies are open or closed to each other, and transmits a second detection signal indicative of the detection of said second detector; and (d2) a second unit which receives said detection signal, and varies said ground length connection in accordance with the detection of said second detector;

wherein said second unit further includes first and second inductances, and wherein said first switch and a second switch are electrically connected to said first and second inductances, respectively, to thereby make said impedance circuit when said detection signal indicates said second frequency band.

14. The cellular phone as set forth in claim 13, wherein each of said first and second switches is comprised of an electrically controllable switch which is automatically grounded or automatically makes said impedance circuit in accordance with a frequency band indicated in said detection signal.

15. The cellular phone as set forth in claim 13, wherein said first and second switches are electrically connected to each other through a cable to which said detection signal is transmitted such that said first and second switches operate in synchronization with each other.

16. A method of operating a cellular phone covering a plurality of frequency bands, including the steps of:

(a) detecting a frequency band in which said cellular phone makes communication with and (b) varying a ground length connection to a ground area in accordance with said frequency band detected in said step (a), wherein said ground area is a ground area of an antenna-matching circuit of said cellular phone, wherein said cellular phone further includes first to N-th printed substrates wherein N is a positive integer equal to or greater than two, and first to N-th switches formed on said first to N-th printed substrates, respectively, and said first to N-th switches operate in synchronization with one another, said method further including the step of grounding said first to N-th switches when said cellular phone makes communication in a first frequency band, and causing said first to N-th switches to make an impedance circuit when said cellular phone makes communication in a second frequency band greater than said first frequency band.

17. The method as set forth in claim 16, wherein said cellular phone includes a first printed substrate, and a first switch formed on said first printed substrate, said method further comprising the step of grounding said first switch when said cellular phone makes communication in a first frequency band, and causing said first switch to make an impedance circuit when said cellular phone makes communication in a second frequency band greater than said first frequency band.

18. The method as set forth in claim 17, wherein said cellular phone further includes a first inductance, said method further including the step of electrically connecting said first switch to said first inductance to thereby make said impedance circuit.

19. The method as set forth in claim 16, wherein said cellular phone further includes first to N-th inductances, said method further including the step of electrically connecting said first to N-th switches to said first to N-th inductances, respectively, to thereby make said impedance circuit.

* * * * *

UNITED STATES PATENT AND TRADEMARK OFFICE
CERTIFICATE OF CORRECTION

PATENT NO. : 7,269,440 B2 Page 1 of 1
APPLICATION NO. : 10/436154
DATED : September 11, 2007
INVENTOR(S) : Hideki Ueda It is certified that error appears in the above-identified patent and that said Letters Patent is hereby corrected as shown below:

Col. 1, lines 13 and 14 delete "independence", insert --dependence--

Signed and Sealed this

Second Day of September, 2008

JON W. DUDAS
*Director of the United States Patent and Trademark Office*